United States Patent [19]
Lumbis

[11] Patent Number: 5,907,193
[45] Date of Patent: May 25, 1999

[54] TRAINLINE POLARITY DETECTOR WITH POWER SOURCE POLARITY SWITCHING

[75] Inventor: Anthony W. Lumbis, Watertown, N.Y.

[73] Assignee: New York Air Brake Corporation, Watertown, N.Y.

[21] Appl. No.: 09/152,245

[22] Filed: Sep. 11, 1998

Related U.S. Application Data

[63] Continuation-in-part of application No. 08/837,112, Apr. 14, 1997, abandoned.

[51] Int. Cl.$^6$ .................................................... H02B 1/24
[52] U.S. Cl. ............................................ 307/9.1; 307/127
[58] Field of Search ........................... 307/9.1, 127, 138; 327/28, 29; 105/61; 361/82, 84, 245, 246; 340/310.01, 310.06, 825.59; 439/956; 335/78

[56] References Cited

U.S. PATENT DOCUMENTS

| | | |
|---|---|---|
| 1,856,455 | 5/1932 | Banks et al. . |
| 3,696,758 | 10/1972 | Godinez, Jr. . |
| 3,868,909 | 3/1975 | Pelabon . |
| 3,901,558 | 8/1975 | Burkett . |
| 4,266,485 | 5/1981 | Bruner et al. ............................... 105/61 |
| 4,374,306 | 2/1983 | Lohr ......................................... 361/246 |
| 4,892,204 | 1/1990 | Lumbis . |
| 5,136,218 | 8/1992 | Pessina . |
| 5,152,410 | 10/1992 | Ta et al. . |
| 5,293,632 | 3/1994 | Novakovich et al. . |
| 5,315,520 | 5/1994 | Drake et al. . |
| 5,412,572 | 5/1995 | Root et al. . |
| 5,581,246 | 12/1996 | Yarberry et al. .................... 340/310.01 |
| 5,581,472 | 12/1996 | Miller et al. . |
| 5,673,876 | 10/1997 | Lumbis et al. . |

OTHER PUBLICATIONS

On–Board Train Information Network Systems, pp. 257–262, Hitachi Review, 43(1994), Dec., No. 6, Tokyo, Japan; Koike et al.

MICAS–S2 distributed traction control for motive power units, pp. 11–20, 8006 ABB Review, (1005) No. 5, Zurich; May 1995.

*Primary Examiner*—Richard T. Elms
*Attorney, Agent, or Firm*—Barnes & Thornburg

[57] ABSTRACT

A method of powering a train powerline with a second source including using a local power controller in the trainline to determine the polarity of the power lines which run through the trainline. The local power controller then connects the second power source to the power lines with the determined polarity. Finally, the local power controller powers the power lines with a second power source once the connection of the appropriate polarity has been made.

27 Claims, 6 Drawing Sheets

TRAINLINE POLARITY DETECTOR WITH POWER SOURCE POLARITY SWITCHING

CROSS REFERENCE

This is a continuation-in-part of U.S. patent application Ser. No. 08/837,112 filed Apr. 14, 1997, now abandoned.

BACKGROUND AND SUMMARY OF THE INVENTION

The present invention relates generally to electrified trains and more specifically to a method and apparatus for connecting a power source to an energized power line of the train.

Electro-pneumatic train braking requires electrical current to be transmitted over wires, serially connected between each car over the entire length of the train or consist from the locomotive. A typical electro-pneumatic (EP) brake system requires from 1200 watts to 2500 watts of power operating at voltages in the range of 230 volts DC.

In trains of substantial length, for example, freight trains, which may extend for a mile and a half to two miles and includes over one hundred cars, there exists a need to provide power sources other than the one at the head locomotive to maintain the current and voltage levels along the trainline. The composition of the train varies continuously. The proposed use of hermaphroditic connectors between the cars increases the changes of polarity reversals throughout the length of the trainline. While this has not caused a problem with respect to any of the equipment on the individual cars, it would cause a problem if additional power sources were connected to the trainline without knowing the appropriate polarity of the trainlines.

The present invention provides a method and apparatus for addressing this problem. The method includes using a local power controller in the trainline to determine the polarity of the power lines which run through the trainline. The local power controller then connects the second power source to the power lines with the determined polarity. Finally, the local power controller powers the power lines with a second power source once the connection of the appropriate polarity has been made.

A master controller, preferably at the locomotive, transmits a power command to the local power controller to initiate determining the polarity, connecting the proper output lines, and applying power to the trainline. The power command is transmitted over the trainlines and preferably over the power lines. To determine the polarity, the local controller places parallel, opposed diodes across the power lines and determines conduction of one of the diodes. This will indicate the polarity of the lines. The local power controller uses a switch to place the diodes across the power lines and the switch may be either relay or transistor switches. The local power controller determines conduction of the diode through an electro-optic isolator. The local power controller also uses a switch to connect the second power source to the power lines with the determined polarity. If the power lines have no polarity, the local power controller connects the second power source to the power lines with a default polarity. The switch may be a relay controlling two sets of form C contacts or may be transistor switches. The local power controller also uses a switch to control the powering of the power lines with the second power source.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
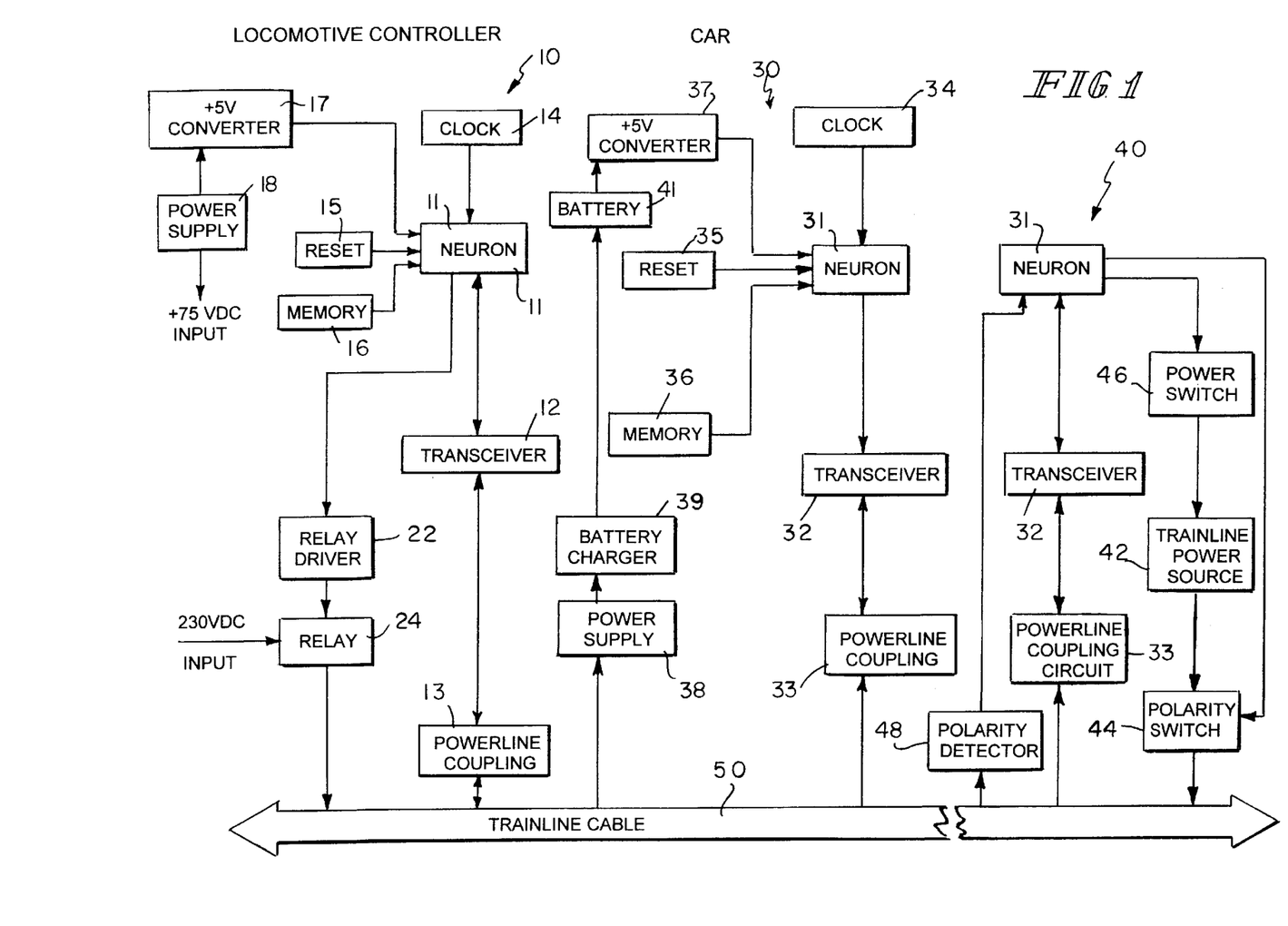
FIG. 1 is a schematic of a train incorporating the principles of the present invention.

A train consist, as illustrated in FIG. 1, includes a locomotive 10, a plurality of cars 30 and a car or locomotive 40 with a second power source connected by trainline 50. The trainline, preferably is a pair of power lines, but may also include other signal lines. The system described provides communications over the power lines but the power and communication lines may be separate lines within the trainline 50. The locomotive 10 communicates and controls the braking and monitors the health of the individual cars using a master brake controller or communications chip 11 which is a Neuron chip as part of a LonWorks communication system, designed by Echelon Corporation of Palo Alto, Calif.

The Neuron chip 11 can communicate via transceiver 12 connected to the trainline 50 via power line coupling circuit 13. The power line coupling circuit 13, for example, can be a transformer and capacitor circuit, to provide DC isolation, the processor consists of a Neuron chip 11, clock 14, reset 15, and memory 16. The Neuron chip 11 is powered by a voltage converter 17 which is connected to a power supply 18. As illustrated, the 75 volt DC input available on the locomotive is conditioned by power supply 18 and provides a 24 volt DC supply to the converter 17. The DC to DC Converter 17 provides 5 volt DC output from the 24 volt DC input. The Neuron chip 11 controls powering or energizing of the power lines on the trainline 50 by a relay driver 22 and a relay 24. The high voltage DC power source on the trainline is connected as an input to the relay 24 and provided on the trainline cable 50 under the control of the relay 24. Typically, the available power source is 230 volts DC.

Each of the individual cars 30 includes a local brake controller or Neuron chip 31, communicating over the trainline 50 via power line transceiver 32 and power line coupling circuit 33. Other components of the controller include the Neuron chip 31, a clock 34, a reset circuit 35, and memory 36. A power supply 38 connected to the trainline 50 receives power from the trainline and charges the battery 41 through the battery charger 39. The battery 41 provides power as an input to the converter 37 which powers the Neuron chip 31.

It should be noted that the Neuron chip 11 and the LonWorks is a preferred communication method. Other communication methods may be used. The communication, control and monitoring system at the locomotive and at the individual cars may include additional elements or pieces of electronics, but those disclosed are those needed to perform the method of the present invention.

Although each of the cars 30 and car or locomotive 40 include a battery 41, the system operates from a 120–240 volts AC or DC with a power level of 1200 to 2500 watts over the trainline 50. The trainline 50 is a serially connected trainline running car to car through an appropriate connector. The battery 41 on each car has sufficient power to operate the Neuron chip 31 and its transceiver 32.

Car or locomotive 40 includes a Neuron chip or controller 31 connected to the trainline 50 by transceiver 32 and coupling circuit 33. It also includes power supply 38, battery charger 39, battery 41 and converter 37, clock 34, reset 35 and timing 36 not shown for sake of clarity. Car or locomotive 40 also includes a trainline power source 42 which is connected by polarity switch 44 to the trainline cable 50. The trainline power source 42 is activated by power switch 46 controlled by Neuron controller 31 as is the polarity switch 44. The Neuron controller 31 with a polarity detector 48 detects the polarity of the power lines in the trainline 50 and sets the appropriate polarity by polarity switch 44. Once this is completed, the power switch 46 activates or connects the trainline power source 42 to the polarity switch 44.

It should be noted that car 40 represents a secondary power source for the trainline which may be on a car or on an additional locomotive within the train consist. The Neuron 31 may be dedicated only to the secondary power source 42 or may be part of the system which is available on the cars for controlling and monitoring other elements including EP brakes.

Figure 3:
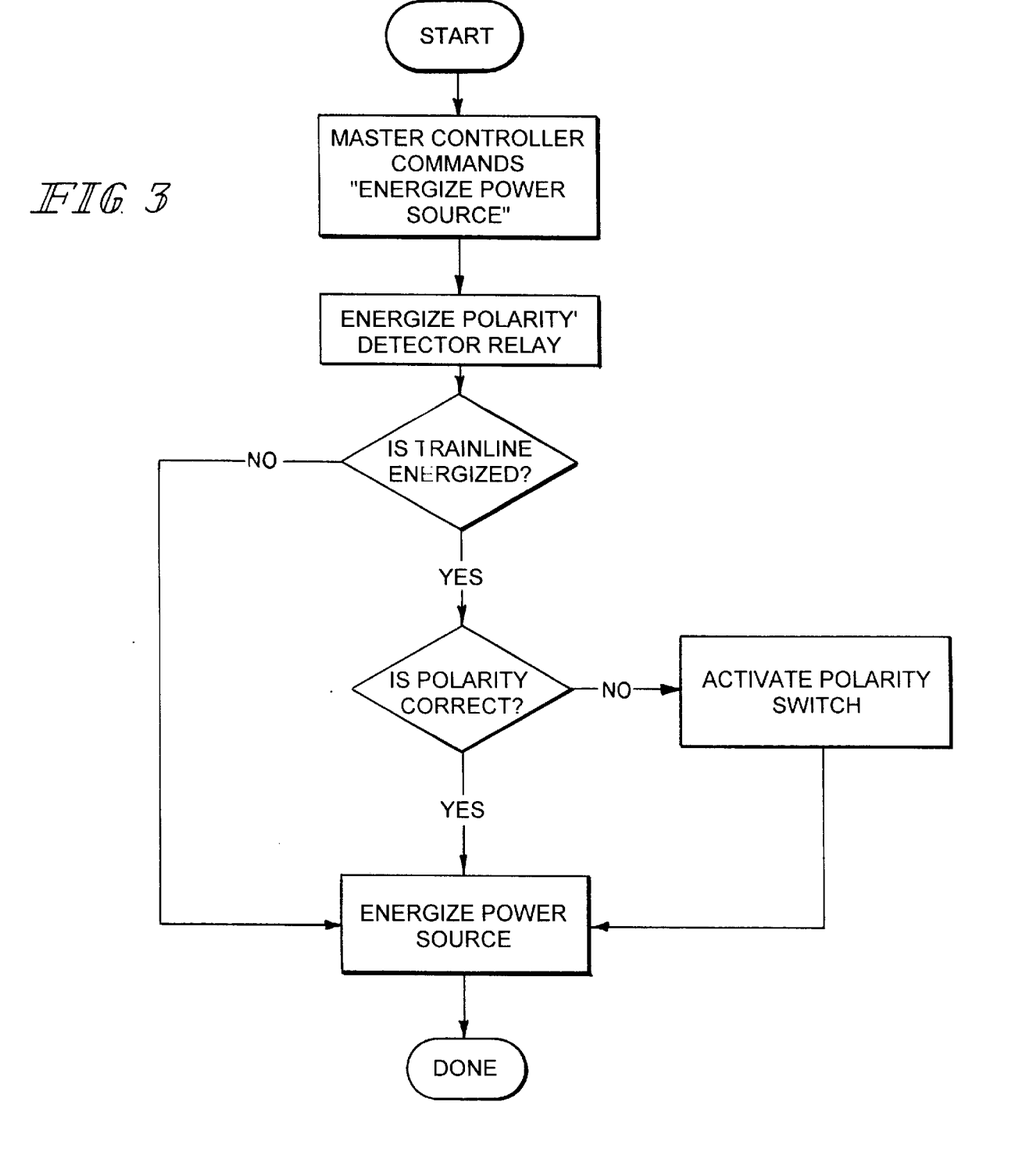
FIG. 3 is a schematic of the flow chart of the method according to the principles of the present invention.

The flow chart for this process is illustrated in FIG. 3 and begins with the receipt of a power command received by Neuron 31 in car 40 from the locomotive controller Neuron 11. This assumes that the locomotive 10 is the master locomotive and car or locomotive 40 is a slave locomotive. This relationship would be determined in a start-up routine, when the train is formed. The energized power source command may also come from the Neuron 31 itself if it is part of a start-up routine. Once an energized power source command is received from any source, the polarity detector relay is energized. The polarity detector will then determine whether the trainline is energized. If it is not, it will energize the power source to the predetermined or default condition. For example, the fault condition may be the Trainline 1 as positive and Trainline 2 as negative.

If the trainline is energized, meaning that one of the sources is connected to the Trainlines, then the polarity is detected. If the polarity is correct, the train is energized through the default switch connection. If the polarity setting of the local power source is incorrect, the polarity switch is activated changing the connection of the power source to the power lines. Thus, the flow chart of FIG. 3 applies to the connection of the power source in the locomotive 10 as well as the car or locomotive 40.

Figure 2:
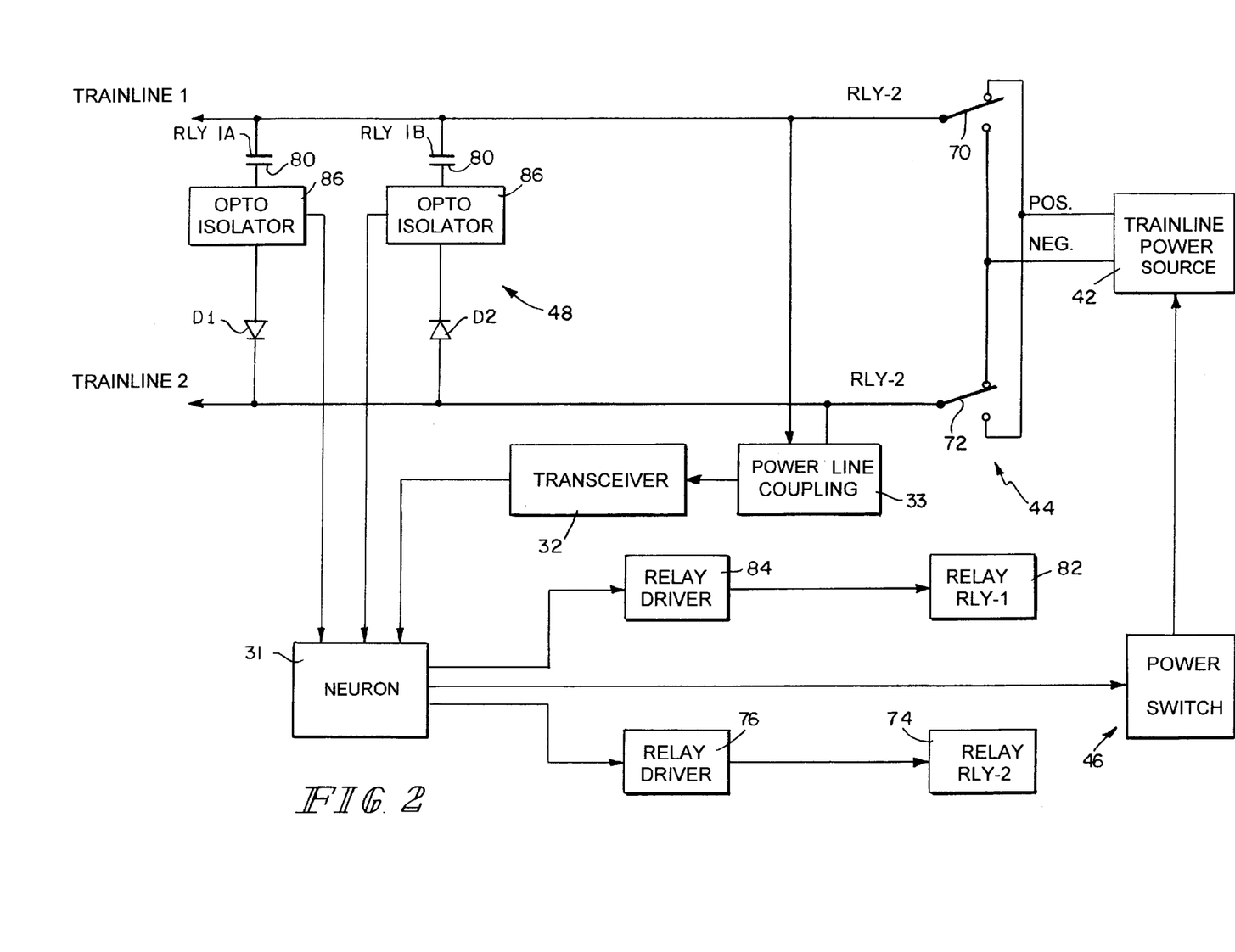
FIG. 2 is a schematic of the polarity detector with power source polarity switching incorporating the principles of the present invention.

An implementation of the system for car 40 is illustrated in FIG. 2, the polarity detector 48 includes a pair of parallel opposed diodes D1 and D2 connected between trainline 1 and trainline 2. The diodes D1 and D2 are selectively connected and disconnected across the trainlines by contacts 80 controlled by relay 82 which is driven by relay driver 84 controlled by the Neuron controller 31. When the Neuron controller 31 receives its command to connect its power source 42, it activates the relay 82 and closes contacts 80 placing the diodes D1, D2 in parallel opposition across the train power lines. The command could be from a master controller or part of its own start-up program. In series with diodes D1 and D2 are electro-optic isolator 86 which determine conduction by one of the two diodes, D1 and D2 and communicates this to the Neuron controller 31. If trainline 1 is positive compared to trainline 2, diode D1 conducts. If trainline 2 is positive with respect to trainline 1, diode D2 conducts. If neither diode conducts, the trainline is not energized or powered, and thus, has no polarity. Using this information, the Neuron controller 31 can determine the polarity of the trainlines or uses the default polarity shown.

The polarity switch 44 is illustrated as two sets of Form C contacts 70 and 72 selectively connected to the positive and negative terminals of the trainline power source 42. The position of contacts 70 and 72 are controlled by relay 74 which is driven by relay driver 76 which is controlled by Neuron controller 31. Based on the polarity determined by Neuron controller 31, the relay 74 is either activated or deactivated. In the deactivated position shown, the positive terminal of the trainline power source 42 is connected to trainline 1 and the negative terminal is connected to trainline 2. This is the default polarity. If the opposite polarity is detected, the Neuron 31 activates relay 74 through relay driver 76 to change the position of contacts 70 and 72 from that shown and connects via contact 70, trainline 1 to the negative terminal of the trainline power source 42 and via contact 72, trainline 2 to the positive terminal of the trainline power source 42. Once the relay contacts 70, 72 are in their appropriate position, Neuron 31 activates trainline power supply by power switch 46.

Figure 5:
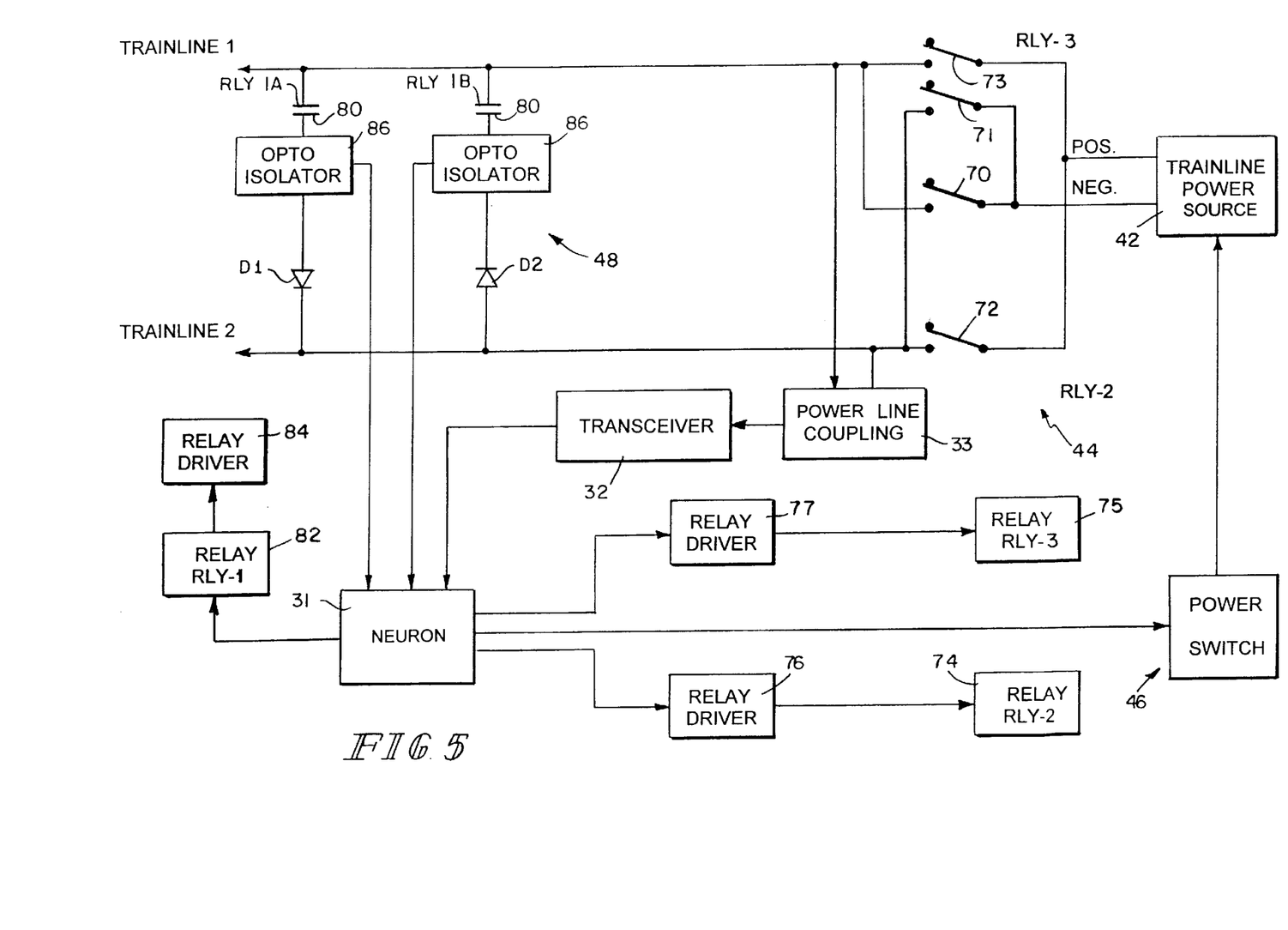
FIG. 5 is a schematic of another embodiment of the polarity detector with power source polarities which are incorporated in the principles of the present invention.

FIG. 5 shows a second embodiment of the polarity switch 44 as having four sets of Form C contacts 70/72 and 71/73 connected to the positive and negative terminals of the trainline power source 42. Also, as compared to that of FIG. 2, a pair of relays 74 and 75 are driven by relay driver 76 and 77 from the Neuron controller 31. Relay 74 controls contact 70 and 72 and relay 75 controls contact 71 and 73. The contact 70/72 and 71/73 are shown in their normally open position. As compared to that of FIG. 2, This provides a positive disconnection between the trainline power supply 42 and the trainlines, trainline 1 and trainline 2. Upon the determination of the proper polarity by the controller 31, one of the two relays 74, 75 is activated by driver 76/77. If relay 74 is activated, contacts 70 and 72 are closed connecting trainline 1 to the negative terminal of the trainline power source 42 and trainline 2 to the positive terminal of the power source 42. If relay 75 is activated, contact 71 and 73 are closed connecting trainline 1 to the positive terminal of trainline power supply 42 and trainline 2 to the negative terminal of the trainline power supply 42.

Figure 6:
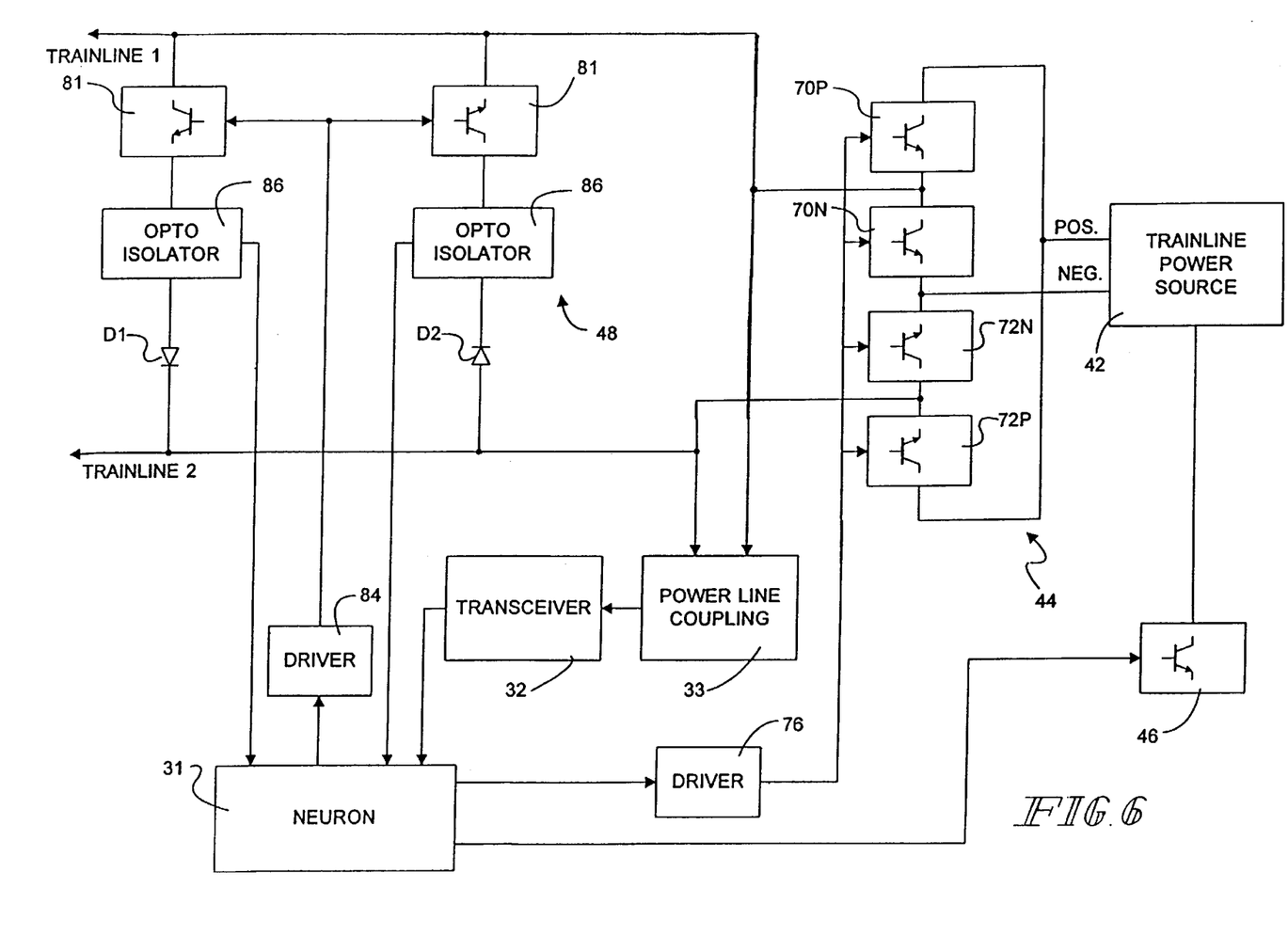
FIG. 6 is a schematic of a polarity detector of FIG. 2 with transistor switches.

The power switch 46 may include a transistor switch as illustrated in FIG. 6 connected to the remote "turn on" circuitry of the trainline power source 42. Closing this power switch 46 energizes a relay within the trainline power source 42 which applies power to the trainline through the previously configured polarity switch 44.

Although the polarity detector 48 and the polarity switch 44 are shown in FIG. 2, as being controlled by relays, the same could be implemented using power transistor switches as illustrated in FIG. 6. The Neuron controller 31 would drive these switches through drivers equivalent to 84 and 76 which would place the diodes D1 and D2 across and disconnect them from being across the trainlines 1 and 2 as well as determining the connection of the polarity of the trainline power source 42 to the trainlines. Transistor switches 81 driven by driver 84 are normally off and then turned on by the driver 84. Transistor 70P is normally on and connects trainline 1 to the positive terminal power of trainline power sources 42. Transistor 70N is normally off and when turned on, would connect the trainline 1 to the negative trainline power source 42. The transistor 72N is normally on and connects trainline 2 to the negative terminal of trainline power source 42. Transistor 72P is normally off and when turned on would connect trainline 2 to the positive terminal of trainline power source 42. Driver 76, when activated, will turn transistors 70P and 72N off and turn transistors 70N and 72P on to change the polarity connection of the trainline power source 42 to the trainlines 1 and 2.

In FIG. 6, the transistor switches are transistor circuits with the appropriate protection and isolation from the trainlines. Thus, they may include additional optoisolators, for example.

Figure 4:
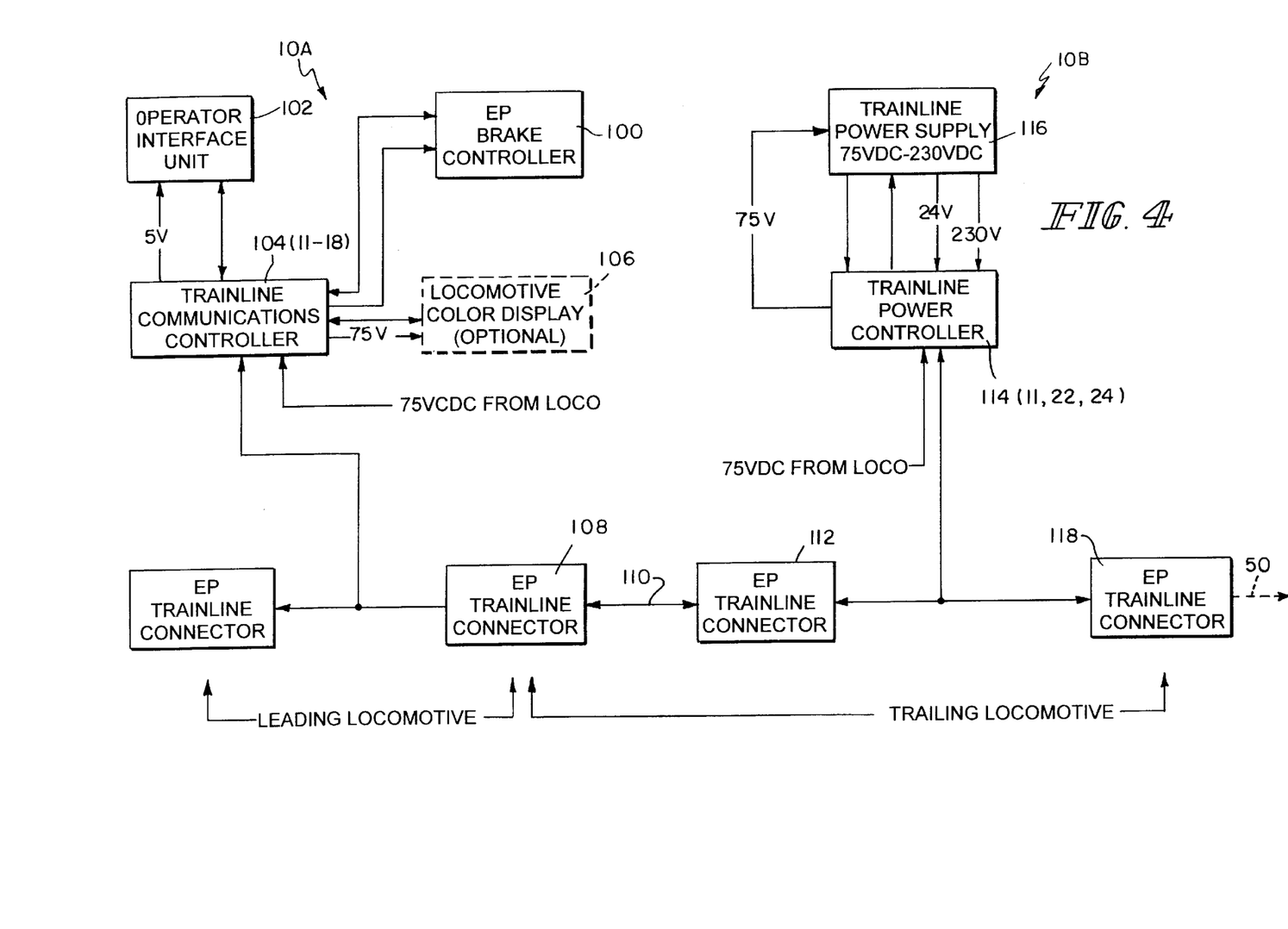
FIG. 4 is a block diagram of a multiple locomotive consist for use with the present invention.

A train may include more than one locomotive at the head end as illustrated in FIG. 4. Two locomotives, for example, 10A and 10B are shown interconnected by an EP trainline 110 to be connected to the trainline 50. Each locomotive has a respective EP trainline connector 108, 112 and 118. The lead locomotive 10A has an EP brake controller 100 and an operator interface unit 102 connected to the trainline communication controller 104. The trainline communication controller 104 would include elements 11–18 of FIG. 1. A locomotive color display 106 is optional. The trainline communication controller 104 is connected to the EP trainline 110 by EP trainline connector 108 of the lead locomotive 10A. The trainline communication control 104 communicates over EP trainline 110.

In the trailing locomotive 10B, a trainline power supply 116 is connected to trainline power controller 114. EP trainline connectors 112 and 118 connected the trainline controller 114 to the to the EP trainline 110. The trainline power controller 114 includes elements 11, 22 and 24 from FIG. 1. The trainline power controller 114 provides the high powered voltage connection to the EP trainline 110 and 50.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a train including at least one locomotive and a plurality of cars, each locomotive and car being serially connected electrically to an adjacent locomotive or car by a trainline having at least two power lines powered by a first power source, a method of powering the power lines with a second source comprising:

determining the polarity of the power lines;

connecting the second power source to the power lines with the determined polarity; and powering the power lines with the second power source.

2. The method according to claim 1, including a local power controller connected to the second power source and the trainlines; and the local power controller performing the determining, connecting and powering.

3. The method according to claim 2, wherein the train includes a master controller; and including transmitting a power command from the master controller to the local power controller to initiate the determining, connecting and powering.

4. The method according to claim 3, wherein the power command is transmitted over the trainlines.

5. The method according to claim 3, wherein the power command is transmitted over the power line.

6. The method according to claim 1, wherein determining the polarity includes placing parallel, opposed diodes across the power lines and determining conduction of one of the diodes.

7. The method according to claim 6, wherein the diodes are placed across the power lines by a switch activated by a local power controller.

8. The method according to claim 1, wherein connecting the second power source to the power lines with the determined polarity includes controlling a condition of a switch by a local power controller.

9. The method according to claim 8, wherein the local power controller also controls powering the power lines with the second power source.

10. The method according to claim 1, wherein determining the polarity includes determining if the power lines have a polarity set by the connection of the first power source and if not, connecting the second power source to the power lines with a default polarity.

11. A train including at least one locomotive and a plurality of cars, each locomotive and car being serially connected electrically to an adjacent locomotive or car by a trainline having at least two power lines powered by a first power source, the train further including:

a second source; and a local power controller which determines the polarity of the power lines, connects the second power source to the power lines with the determined polarity, and powers the power lines with the second power source.

12. The train according to claim 11, wherein the train includes a master controller which transmits a power command to the local power controller to initiate the determining, connecting and powering.

13. The train according to claim 12, wherein the power command is transmitted over the trainlines.

14. The train according to claim 12, wherein the power command is transmitted over the power line.

15. The train according to claim 11, including a switch activated by a local power controller placing parallel, opposed diodes placed across the power lines, and the local power controller determines the polarity by determining conduction of one of the diodes.

16. The train according to claim 15, including electro-optic isolators connecting the diodes to the local power controller.

17. The train according to claim 15, wherein the switch includes a relay having a pair of contacts in series with each of the diodes.

18. The train according to claim 15, wherein the switch includes a semiconductor switch in series with each of the diodes.

19. The train according to claim 11, including a first switch con trolled by the local power controller to connect the second power source to the power lines with the determined polarity.

20. The train according to claim 19, wherein the first switch includes a relay controlling a pair of Form C contacts connecting the second power source to the power lines.

21. The train according to claim 19, wherein the first switch includes semiconductor switches connecting the second power source to the power lines.

22. The train according to claim 19, including a second switch controlled by the local power controller to connect the second power source to the first switch to power the power lines with the second power source.

23. The train according to claim 22, wherein the second switch includes a solid state switch driving a relay with two normally open contacts and connecting the second power source to the first switch.

24. The train according to claim 19, wherein the first switch includes two relays, each controlling a pair of contacts connecting the second power source to set power lines, each relay connecting the second power source to the power lines with the different polarity.

25. The train according to claim 24, wherein the pair of contacts of each relay are normally open.

26. The train according to claim 11, wherein the local power controller connects the second power source to the power lines with a default polarity if the local power controller determines that the power lines have no polarity.

27. The train according to claim 11, wherein the local power controller initiates the determining, connecting and powering upon start up.

* * * * *